United States Patent Office 3,539,287
Patented Nov. 10, 1970

3,539,287
GRAFT POLYMERISATION PROCESS EMPLOYING HALOGENATED NITROGENOUS POLYMERS
Clement Henry Bamford, Liverpool, and Frederic James Duncan and Reginald John William Reynolds, Runcorn, England, assignors to Imperial Chemical Industries Limited, London, England, a corporation of Great Britain
No Drawing. Original application Oct. 23, 1965, Ser. No. 504,057, now Patent No. 3,433,774. Divided and this application Sept. 16, 1968, Ser. No. 835,820
Claims priority, application Great Britain, Nov. 11, 1964, 45,958/64, 45,959/64
Int. Cl. D06m 9/00
U.S. Cl. 8—115.5     4 Claims

ABSTRACT OF THE DISCLOSURE

A process for modifying a polymer containing a plurality of >N—H groups in fibrous form comprises treating the polymer with a halogenating agent to halogenate at least one of the nitrogen atoms and thereafter contacting the halogenated product with ethylenically unsaturated monomeric material which is normally polymerized by free radicals and a transition metal carbonyl.

---

This is a division of our copending application, Ser. No. 504,057, filed Oct. 23, 1965, now U.S. Pat. No. 2,433,774.

This invention relates to a polymerisation process and more particularly to the polymerisation of ethylenically unsaturated monomers using organometallic catalysts.

According to the presnet invention we provide a process for the polymerisation of ethylenically unsaturated monomers normally polymerisable by free radicals which comprises contacting the monomeric material with a catalyst system comprising an N-halogenated organic compound and a transition metal carbonyl.

The polymerisation process may be operated without the need to exclude air and, in its preferred form, the invention provides a process for grafting polymers of ethylenically unsaturated monomers on to natural or synthetic polymers containing >N—H groups in the repeating units of the polymer chains which avoids the disadvantages often accompanying the prior peroxidation step normally required to provide the grafting centres.

The ethylenically unsaturated monomers suitable for polymerisation according to the process of our invention are those whose polymerisation is normally initiated by free radical catalysts and especially those containing an electron-attracting group, e.g., a carboxylic acid or ester group, attached to an ethylenically bound carbon atom. Examples of monomers containing electron-attracting groups include vinyl pyridines, acrylic monomers (for example acrylic and methacrylic acids and their esters, amides, nitriles and homologues) and aralkenes (for example styrene) and mixtures thereof. Other monomers, e.g. vinyl chloride, vinyl esters (as in vinyl acetate) and vinylidene chloride may also be polymerised by our process.

The transition metal carbonyl component of the catalyst system may be a simple carbonyl or a mixed carbonyl where ligands other than carbonyl groups are also present.

Examples of simple metal carbonyls which may be used include carbonyls of iron, cobalt, nickel, molybdenum, tungsten, chromium, manganese or rhenium; for example molybdenum hexacarbonyl, tungsten hexacarbonyl, tetracobalt dodecacarbonyl, iron pentacarbonyl, iron enneacarbonyl, tri-iron dodecacarbonyl, chromium hexacarbonyl or mixtures thereof. Of these, the molybdenum, manganese and cobalt carbonyls generally give greatest initiating activity in our process. Molybdenum carbonyl is particularly effective in polmerisation processes in which no precautions are taken to exclude air.

As stated hereinbefore, there may also be used as the carbonyl a metal derivative having one or more other groups, in addition to one or more carbonyl groups, attached to the metal atom; i.e., part carbonyls as in metal carbonyl halides and metal cyclopentadienyl carbonyls.

The metal carbonyl may be used if desired in conjunction with an organic phosphine, arsine or stibine. Organic phosphines are generally preferred and a variety of them may be used for this purpose, including those containing more than one phosphorus atom in their molecule. The organic phosphine, arsine or stibine may be first reacted with the carbonyl to form a complex therewith which is then used as catalyst in our process or else a simple mixture of carbonyl and phosphine may be used.

The organic phosphine is a phosphine in the formula of which one or more of the hydrogen atoms has or have been replaced by monovalent organic radicals. It may contain one or more phosphorus atoms in its molecule, and may be a phosphine notionally derived from $PH_3$, $PH_2.PH_2$ or a hydride having two phosphorus atoms linked by a divalent organic radical, as in $$PH_2.(CH_2)_n.PH_2$$

where $n$ is an integer. The substituents attached to phosphorus atoms in the organic phosphines generally replace all the hydrogen atoms of the parent phosphine. These substituents, which may be the same or different, are preferably hydrocarbon radicals of the aliphatic, aromatic and cycloaliphatic series (including aralkyl and alkaryl radicals). Substituted hydrocarbon radicals containing for example a halogen as substituent may also be used. The readily available phosphines contain alkyl groups having from 1 to 4 carbon atoms or phenyl groups. As examples of particular organic phosphines there may be mentioned tetramethyldiphosphine, tetraethyldiphosphine, tetraphenyldiphosphine, trimethylphosphine, triethylphosphine, triphenylphosphine, tributylphosphine, 1,2-bis(dimethylphosphino)ethane, phenyldiethylphosphine and mixtures thereof.

Where the metal carbonyl is interacted with the organic phosphine before use, the complexes thus obtained may be divided conveniently into five common forms, of which two are thought to have a linear structure, two a bridged structure and one a ring structure, as represented respectively by the following Formulae, I, II, III, IV and V, which have no steric significance:

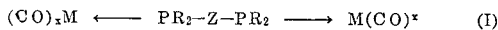     (I)

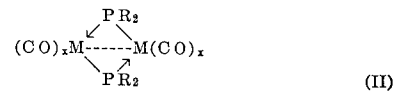     (II)

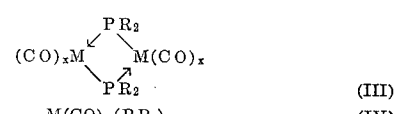     (III)

$M(CO)_x(PR_3)_y$     (IV)

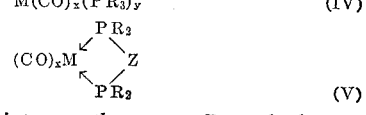     (V)

wherein $x$ and $y$ are integers, the groups R are hydrocarbon or substituted hydrocarbon radicals which may be the same or different, Z is a direct link or a divalent organic radical and M is a metal atom. In all these structures, one or more of the carbonyl groups may be replaced by other ligands (e.g., cyclopentadiene or triphenylphosphine) so long as at least one carbonyl group remains attached to each metal atom. Also, in structures II and III, one of the $PR_2$ bridging groups may be replaced, if desired, by another bridging group. In Formula II the metal-to-metal bond may be replaced by halogen atoms linked to the metal atoms, e.g., as in the compound represented as

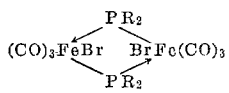

In Formulae IV and V one or more of the carbonyl groups may be replaced by a halogen atom or atoms, so long as at least one carbonyl group is left. Particular examples are represented by the following structures which have no steric significance:

(1) 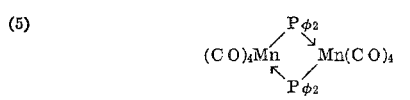
(2) 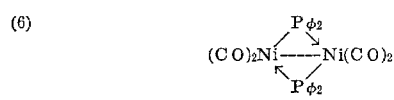
(3) 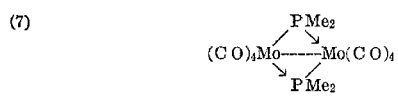
(4) 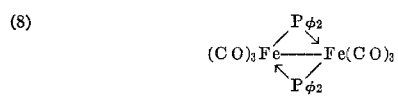
(5) 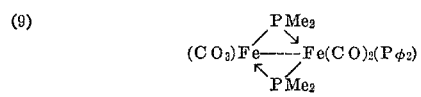
(6) 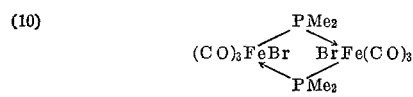
(7) 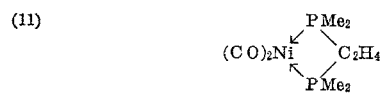
(8) 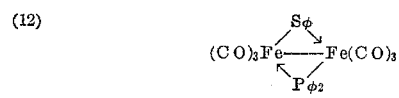
(9)

$$(CO)_3Fe \underset{PMe_2}{\overset{PMe_2}{\diamond}} Fe(CO)_2(P\phi_2)$$

(10)

$$(CO)_3FeBr \underset{PMe_2}{\overset{PMe_2}{\diamond}} BrFe(CO)_3$$

(11)

$$(CO)_2Ni \underset{PMe_2}{\overset{PMe_2}{\diamond}} C_2H_4$$

(12)

$$(CO)_3Fe \underset{P\phi_2}{\overset{S\phi}{\diamond}} Fe(CO)_3$$

where Me=methyl, Et=ethyl and $\phi$=phenyl. Of these,

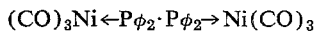

is particularly effective in processes operated in the presence or absence of oxygen.

The simple carbonyl phosphine complexes may be made by heating together the metal carbonyl and the phosphine at elevated temperature and pressure, for example as described by Hayter (Journal of the American Chemical Society, 1964, 86, 823 and Inorganic Chemistry 1964, 3, 711), by Chatt and Thornton (Journal of the Chemical Society, 1964, 1005) and by Chatt and Thompson (Journal of the Chemical Society, 1964, 2713). The requisite conditions depend upon the individual components employed, but suitable temperatures are in the range 25° C. to 250° C., and the heating time is generally in the range 20 to 30 hours. It is usually appropriate to add a hydrocarbon solvent or diluent, for example benzene, and to carry out the heating under the autogenous pressure developed in a sealed vessel, although other pressures, including atmospheric pressure, may be used in some instances. The proportions of carbonyl and phosphine are usually such as to provide one atom of phosphorus for each atom of metal although excess of either component may be used.

Complexes wherein carbonyl or phosphine groups have been replaced by other groups may be formed by suitable reaction of the parent complex. For example, the complex identified as No. 9 may be prepared by dissolving di-$\mu$-dimethylphosphino-bis(tricarbonyl-iron) and triphenylphosphine in a hydrocarbon solvent and irradiating the solution with visible or U.V. light for several days. The product may be purified by chromatography and recrystallisation from a suitable solvent. The complex identified as No. 10 may be prepared by dissolving the parent phosphine-carbonyl in a suitable solvent (e.g., carbon tetrachloride or benzene) and adding one equivalent of halogen dissolved in the same solvent. The precipitate may be removed by filtration and purified by recrystallisation.

Owing to the inflammable and toxic nature of the components, it may be desirable, and sometimes essential, to form the complexes with exclusion of air or other oxidising materials.

The resulting complexes may be isolated or recovered from the mixture in which they are formed using conventional techniques, for example crystallisation, filtration, etc. or may be used directly without purification.

The organic arsines and stibines that may be used are arsines and stibines in the formulae of which one or more of the hydrogen atoms may be replaced by monovalent organic radicals. The substituents attached to arsenic or antimony atoms in the organic arsines and stibines generally replace all the hydrogen atoms of the parent arsine or stibine. These substituents, which may be the same or different, are preferably hydrocarbon radicals of the aliphatic, aromatic and cycloaliphatic series (including aralkyl and alkaryl radicals). Substituted hydrocarbon radicals containing for example a halogen as substituent may also be used. The readily available compounds contain alkyl groups having from 1 to 4 carbon atoms or phenyl groups. As examples of particular organic arsines and stibines, there may be mentioned as $As(CH_3)_3$,

$$As(C_6H_5CH_2)_3$$
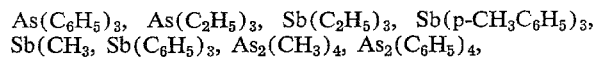
$As(C_6H_5)_3$, $As(C_2H_5)_3$, $Sb(C_2H_5)_3$, $Sb(p-CH_3C_6H_5)_3$, $Sb(CH_3)_3$, $Sb(C_6H_5)_3$, $As_2(CH_3)_4$, $As_2(C_6H_5)_4$,
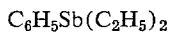
$$C_6H_5Sb(C_2H_5)_2$$

and $Sb_2(CH_3)_4$.

The proportion of metal carbonyl to be used in our process is in general up to $1\times10^{-2}$ gm. mole per litre in the reaction medium. Larger proportions may be used if desired, although it may be found that little or no additional advantage is thereby achieved and in some cases, even, the yield may be adversely affected. It is preferred to use proportions in the range $1\times10^{-5}$ to $1\times10^{-3}$ gm. mole per litre in the reaction medium. In the case of combinations of carbonyls with phosphines, arsines or stibines these proportions may be applied either to the carbonyl or the phosphine or to the carbonyl/phosphine, arsine or stibine complex.

The N-halogenated compounds may be in particular N-halogenated derivatives of compounds containing the group —NH—CO— or —NH—$SO_2$—, these being in general more readily available and more easily handled than N-halogenated amines some of which may be explosive. Examples are N-halogenated derivatives of amides, imides and sulphonamides. N-chlorinated and N-brominated compounds are in general the most readily available and we have found that their activity may be improved by increasing the number of halogen atoms linked to the nitrogen atom and by linking the N-halogenated nitrogen atom to an electron-withdrawing group, e.g., $C_6H_5$—, —COOH or —CO—. N-bromoacetamide, N-chloro-N-ethylacetamide, N-bromosuccinimide, N-chloro- and N,N-dichloro-p-toluenesulphonamide, N-chlorobenzamide and N-chlorotriazines are examples of N-halogenated compounds.

Care must be taken when choosing an N-halogenated compound for use in conjunction with a corbonyl/phosphine complex; side reactions may occur to the detriment of the polymerisation if the halogen atom is very active, e.g. as in N-bromosuccinimide.

The amount of N-halogenated compound required will depend upon its own nature and the choice of metal carbonyl and monomeric material. It is generally from $5 \times 10^{-3}$ to $2 \times 10^{-1}$ gm. mole per litre in the reaction medium although amounts as low as $10^{-5}$ gm. mole per litre may be operable in some circumstances and the upper limit is fixed only by economic factors.

According to a much preferred embodiment of our invention the N-halogenated compound used in the process is an N-halogenated derivative of a polymer containing a plurality of >N—H groups in the polymer chain. During the course of this particular embodiment of our process, units derived from the ethylenically unsaturated material are grafted on to the polymer chains of the N-halogenated polymer, being linked thereto through the nitrogen atoms. Thus the process allows the production of graft polymer products and may be used to modify the surface properties, e.g., dyeability, antistatic properties or water repellancy of polymers containing >NH groups.

The process has the advantage that it allows the use of pre-halogenated nitrogenous polymers and the number of grafting centres on the polymer chains is subject to greater control than is normally possible using processes involving, e.g., peroxidation of the polymer chains. Also, it provides a process for grafting on to natural nitrogenous polymers, e.g., wool and gelatin, which avoids the undesirable use of oxidising agents such as peroxides.

The N-halogenated compounds used in the process may be in particular N-halogenated derivatives of natural or synthetic polymers containing —CONH— groups, e.g., polyureas, polyamides, polyurethanes, polypeptides and proteins, for example wool, silk and gelatine.

The parent polymers may be converted to their N-halogenated derivatives in known manner, for example by treatment with a halogen (as a gas or vapour or as a solution in water or in an organic solvent or diluent) or by treatment with a conventional halogenating agent. Chlorine, for example, may be introduced very conveniently by treating the parent material with an acidified aqueous solution of a hypochlorite. The halogen is preferably chlorine or bromine; iodine may have an inhibiting effect on polymerisation. Halogenation of the nitrogenous polymeric material may be carried out to the extent that all the >N—H groups present are converted to the N-halogenated form. It is not essential, however, for full halogenation to be carried out and our invention is also applicable to the use of polymers which are only partially halogenated in this way. The halogenation of one >N—H group in the polymer chain is sufficient to provide a site for grafting by our process but in general we have found that in order to obtain a useful modification of the properties of the parent polymer, halogenation should be effected to the extent of yielding products containing from 0.1 to 6% by weight of halogen. In the case of nylons, however, it is generally preferred not to exceed 2 to 3% by weight.

As stated above, the products obtained from this process are graft polymers wherein the polymer chains derived from the ethylenically unsaturated material depend from the previously halogenated nitrogen atoms of the nitrogenous polymers. For example, after extraction with chloroform to remove any styrene homopolymer, the product of treating a sample of wool with styrene according to our invention yielded a chloroform-insoluble residue which weighed more than the original sample of wool before treatment. This chloroform-insoluble residue was hydrolysed to break down the wool and then extracted with chloroform. The product of the hydrolysis was found to be almost wholly soluble in the chloroform and the extract on analysis was shown to be polystyrene containing nitrogen, thereby demonstrating that styrene polymer chains had been chemically bound to the wool.

The amount of grafted polymer required to provide a useful modification of the surface properties of the parent nitrogenous polymer will depend upon the nature of the grafted material and the purpose of the modification. For example, where the process is effected to provide improved dyeability, a weight increase of 3 to 5% is generally desirable while if it is intended to modify the antistatic properties, satisfactory results may be obtained by one tenth of that weight increase. The increase in weight may be controlled suitably by controlling the reaction time.

Whether a monomeric or polymeric N-halogenated compound is used, the process of this invention may be aided photochemically or, more usually, by heat, depending upon the particular catalyst system and reaction conditions employed.

Conveniently the temperature of reaction will lie in the range 20° C. to 100° C., preferably 40° C. to 80° C., although higher or lower temperatures may be used if desired. The polymerisation may be effected at substantially atmospheric pressure, although higher or lower pressures may be used if desired, particularly where the monomeric material is volatile. The time required for the polymerisation is dependent upon several factors, including the individual components employed, their concentration, the temperature of polymerisation and the molecular weight required for the product. Times of from 5 minutes to several hours are suitable for most circumstances.

The polymerisation may be carried out in solution in a solvent or diluent, or in the absence of such solvent or diluent, but it is particularly convenient to add the metal carbonyl as a solution in a solvent. Suitable solvents or diluents for this purpose include others (for example tetrahydrofuran), esters (for example ethyl acetate) and nitriles (for example benzonitrile), or mixtures thereof. Some solvents may act as chain transfer agents in the polymerisation process. In the case of the graft polymerisation process, the use of a solvent or diluent often reduces the amount of homopolymer, relative to graft polymer, which is frequently formed as a by-product of the reaction. Suitable amounts of solvent or diluent range from 1 to 9 volumes per volume of monomer, the higher concentrations of solvent or diluent generally improving the ratio of graft polymer to homopolymer obtained.

In general, in the free-radical polymerisation of ethylenically unsaturated monomers it is desirable to exclude oxygen from the reaction mixture since this is normally regarded as an inhibitor of such polymerisation. We have found that our process may proceed satisfactorily without the need for such precaution although in most instances the yield may be increased if air is excluded. The presence of moisture can be tolerated and the polymerisation may be effected in aqueous media.

In a preferred embodiment, the polymerisation according to our invention may be carried out by adding the N-halogenated organic compound (be it monomeric or polymeric in nature) to a solution of the metal carbonyl in the monomeric material. If desired, the reaction may be effected in an inert organic solvent or diluent as described above.

The process may be effected batchwise or using continuous or semi-continuous methods and the polymeric products may be isolated by conventional techniques, for example by precipitation from solution by pouring the reaction mixture into a liquid in which the product is sparingly soluble, for example methanol, petroleum ether or the like. Alternatively, the polymerisation product where it is other than a graft polymer may be dissolved in a suitable solvent and then re-precipitated by dilution with another solvent. In the graft polymerisation process it may be desirable to remove any homopolymer that may have formed, e.g., by extraction using a selective solvent. In many cases, however, the mixture of polymeric products may be used as such.

The products produced by the process of our invention using monomeric N-halogenated organic compounds are normally thermoplastic materials suitable for moulding and forming into films, fibres or coatings. They may be blended with polymer additives such as fillers, pigments, lubricants, mould-release agents and heat and light stabilisers and mixed with other polymers, both natural and synthetic, if desired.

The graft polymers obtained by using N-halogenated polymers as the N-halogenated organic compounds have valuable properties which are quite distinct from those of the original nitrogenous polymer from which they are formed. The precise properties obtained will of course depend to some degree upon the particular N-halogenated polymer and ethylenically unsaturated monomer used as starting materials but the products are usually sparingly soluble or insoluble in common solvents. In general our process has the advantages of enabling selected surface properties, e.g. dye-receptivity, antistatic properties, water repellancy, etc., to be imparted to nitrogenous polymers whose physical properties are otherwise satisfactory, for example in respect of their intrinsic strength.

In its much preferred embodiment, our invention is especially applicable to the treatment or improvement of nitrogen-containing polymers in fibrous form, for example wool, by converting them to their N-halogenated derivatives and subsequently treating them by our process as described above.

The invention is illustrated but not limited by the following examples in which the parts and percentages are by weight.

EXAMPLE 1

0.54 part of a compound having the formula $Ni_2(CO)_6P_2(C_6H_5)_4$ and thought to have the structure

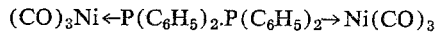

19.94 parts of N-bromosuccinimide and 936 parts of methyl methacrylate were placed in a glass tube in the presence of air. The tube was closed, and the mixture was heated at 80° C. for 2 hours. The tube was then reopened, and the contents (a viscous liquid) were poured into methanol to precipitate the polymer. The yield of polymer was 128 parts.

EXAMPLE 2

The procedure of Example 1 was repeated using 0.55 part of the carbonyl nickel phosphine, 22.78 parts of the sodium salt of N-chloro-p-toluene sulphonamide and 936 parts of methyl methacrylate. The yield of polymer was 80 parts.

EXAMPLE 3

The procedure of Example 1 was repeated using 0.48 part of $Mo(CO)_6$, 27.49 parts of N-bromosuccinimide and 936 parts of methyl methacrylate. The yield of polymer was 151 parts.

EXAMPLE 4

0.51 part of a compound having the formula

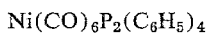

and the probable formula

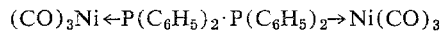

35.68 parts of N-chlorinated wool (containing 0.18 weight percent of chlorine) and 936 parts of methyl methacrylate were placed in a glass tube in the presence of air. The tube was closed and heated at 80° C. for 2 hours. It was then re-opened and the contents poured into chloroform and refluxed for several hours. The chloroform solution was filtered to collect the wool, which was washed with chloroform and dried in vacuo at 40° C. The weight of the treated wool was 38.99 parts a weight increase of 9.3%.

EXAMPLE 5

The procedure of Example 4 was repeated using 0.50 part of $Mo(CO)_6$, 34.20 parts of chlorinated wool (containing 0.18 weight percent of chlorine) and 936 parts of methyl methacrylate.

The weight of treated wool was 35.81 parts, a weight increase of 4.7%.

EXAMPLE 6

The procedure of Example 4 was repeated using 0.53 part $Mn_2(CO)_{10}$, 34.50 parts of wool (containing 0.18 weight percent of chlorine) and 936 parts of methyl methacrylate, the tube being wrapped in foil to stop any photochemical reaction.

The weight of treated wool was 34.93 parts, a weight increase of 1.2%.

EXAMPLE 7

0.77 part of molybdenum hexacarbonyl and 32.9 parts of N-bromosuccinimide were placed in a glass vessel and thoroughly degassed. 1,000 parts of freshly purified and degassed methyl methacrylate were distilled under vacuum into the vessel, which was then sealed. The mixture was warmed and agitated sufficiently to ensure thorough mixing, and was then maintained at 80° C. for 2 hours. After this time, the vessel was opened and the contents (a viscous solution) were poured into methanol to precipitate polymethyl methacrylate. The precipitated solid was collected by filtration, and purified by solution in chloroform followed by reprecipitation with methanol. The yield of polymer was 216.7 parts.

EXAMPLE 8

The procedure of Example 7 was repeated using 0.52 part of molybdenum hexacarbonyl, 52.8 parts of N-bromoacetamide and 1,000 parts of methyl methacrylate. The yield of purified polymer was 32.9 parts.

EXAMPLE 9

0.1 part of manganese carbonyl $Mn_2(CO)_{10}$ and 6.12 parts of a fabric, woven from fibres of poly($\gamma$ methyl 1-glutamate) and N-chlorinated until it contained 5.74% by weight of chlorine, were placed in a tube of "Pyrex" glass and degassed thoroughly under high vacuum. 1,000 parts of freshly distilled methyl methacrylate were next distilled into the tube, which was then sealed, agitated in the dark sufficiently to mix the contents thoroughly, and warmed to 25° C. in a thermostat tank. The mixture was then irradiated for 2 hours at this temperature by light of 4,300–5,500 A., obtained from a medium-pressure mercury arc lamp shining through an appropriate filter.

The tube was then opened and the cloth was removed and extracted with boiling chloroform to remove homopolymer (polymethyl methacrylate). After repeated extraction and drying at 40° C. in a vacuum oven, the cloth weighed 8.22 parts, an increase of 34.4%.

The procedure used for preparing the chlorinated polymers used as starting material in this and the following three examples was as follows:

The appropriate nitrogenous polymer (e.g. wool, silk, nylon, etc.) was soaked for a period of 0.5–10 minutes in a dilute aqueous solution of sodium hypochlorite (approximately 0.5–2 gm./litre active chlorine) acidified to pH 4–4.5 with acetic acid. The strength of the solution and the time of soaking were adjusted to give the requisite chlorine content for the polymer. The polymer was then washed with water and dried in vacuo.

EXAMPLE 10

0.11 part of molybdenum hexacarbonyl and 2.95 parts of an N-chlorinated nylon 66 monofil (containing 0.62% of chlorine) were placed in a tube of "Pyrex" glass and degassed thoroughly under high vacuum. 1,000 parts of freshly distilled methyl methacrylate were next distilled into the tube, which was then sealed, agitated sufficiently to mix the contents thoroughly and warmed in a thermostat tank to 60° C., at which temperature it was maintained for 16 hours. The tube was then opened, and the monofil removed and extracted with boiling chloroform to remove homopolymer (polymethyl methacrylate). After repeated extraction and drying in a vacuum oven at 40° C. the monofil weighed 3.43 parts, an increase of 16%.

This procedure was repeated using different monomers and chlorinated nylons. The results obtained are summarised in the following Table 1.

Catalysts

B—A compound having the formula $Fe_2(CO)_6P_2(CH_3)_4$ and thought to have the structure

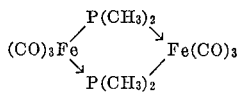

C—Molybdenum hexacarbonyl

Monomers

MMA—Methyl methacrylate
MAA—Methacrylic acid
S—Styrene
VA—Vinyl acetate
AN—Acrylonitrile
Nylon 6 is poly(epsilon-caprolactam)
Nylon 6.6 is poly(hexamethylene adipamide)
Nylon 6.10 is poly(hexamethylene subacamide)

EXAMPLE 11

The procedure of Example 10 was repeated using N-chlorinated natural polymers (i.e. wool, silk and gelatin), with various catalysts and monomers. The results are summarised in the following Table 2. The reaction period in all instances was 2 hours.

TABLE 2

| Polymer | Percent Cl | Weight | Monomer | Carbonyl and weight | Reaction temp., °C. | Product Weight | Percent increase |
|---|---|---|---|---|---|---|---|
| Wool | 1.76 | 8.4 | MMA | B, 0.34 | 60 | 8.68 | 3.3 |
| Do | 1.76 | 13.92 | MAA* | B, 0.68 | 60 | 16.39 | 17.7 |
| Do | 0.81 | 7.29 | S | C, 0.38 | 60 | 7.47 | 2.5 |
| Do | 0.81 | 5.35 | VA | C, 0.33 | 60 | 5.57 | 4.1 |
| Do | 1.76 | 4.65 | AN | C, 0.35 | 60 | 4.96 | 6.7 |
| Silk | 0.67 | 7.80 | MMA | C, 0.25 | 80 | 9.41 | 20.6 |
| Do | 0.67 | 8.43 | S | C, 0.48 | 80 | 8.67 | 2.8 |
| Gelatin | 2.36 | 5.01 | MMA | C, 0.36 | 60 | 5.17 | 3.2 |

Note.—The amount of monomer used was 1,000 parts in all instances except the second one (marked with asterisk), in which it was 600 parts.

EXAMPLE 12

The procedure of Example 10 was repeated using the N-chlorinated poly(methyl glutamate) fabric specified in Example 3 and various catalysts and monomers.

TABLE 1

| | Percent Cl | Weight | Monomer | Weight of Mo(CO)₆ | Reaction Time, hours | Reaction Temp., °C. | Product Weight | Percent increase |
|---|---|---|---|---|---|---|---|---|
| Polymer: | | | | | | | | |
| Nylon 6 | 5.37 | 8.41 | MMA | 0.21 | 2 | 80 | 9.47 | 12.6 |
| | | 10.09 | S | 0.57 | 2 | 80 | 10.87 | 7.8 |
| | | 12.00 | MMA | 0.47 | 2 | 80 | 12.55 | 4.9 |
| Nylon 6.6 | 0.62 | 2.95 | MMA | 0.11 | 16 | 60 | 3.43 | 16 |
| | | 1.40 | MAA | 0.37 | 2.5 | 60 | 1.45 | 3.6 |
| | | 9.94 | S | 0.64 | 2 | 80 | 10.09 | 1.5 |
| Nylon 6.10 | 0.91 | 1.81 | MMA | 0.47 | 2 | 60 | 1.94 | 7.2 |
| | | 21.76 | MAA | 1.12 | 2 | 80 | 22.82 | 4.9 |
| | | 12.24 | S | 0.50 | 2 | 80 | 12.75 | 4.2 |
| | | 10.36 | VA | 0.52 | 2 | 70 | 10.78 | 4.1 |

In this and the following examples where applicable the abbreviations have the following meaning.

The results obtained are summarised below in Table 3.

TABLE 3

| | Monomer | Carbonyl and weight | Reaction Time, (hrs.) | Reaction Temp., (°C.) | Product Weight | Percent increase |
|---|---|---|---|---|---|---|
| Weight of fabric: | | | | | | |
| 6.25 | MMA | B, 2.2 | 4 | 25 | 7.72 | 23.5 |
| 12.43 | S | C, 5.6 | 2 | 80 | 13.90 | 11.8 |
| 5.74 | AN | B, 0.9 | 16.5 | 25 | 11.48 | 100 |

EXAMPLE 13

A number of polymers were brominated by immersion in a solution of bromine and potassium hydroxide in water which had been acidified to pH 4 with acetic acid. The immersion was effected for 0.5 to 5 minutes and each product was then washed with water and dried in vacuo.

The process of Example 10 was then repeated using the N-brominated products as obtained and various monomers. In each experiment the process was allowed to proceed for 2 hours and the carbonyl was $Mo(CO)_6$. The results are summarised in Table 4.

TABLE 4

| Polymer | Percent Br | Weight | Monomer | Wt. of carbonyl | Reaction temp., °C. | Product Weight | Percent increase |
|---|---|---|---|---|---|---|---|
| Polymethyl glutamate | 3.5 | 7.92 | MAA | 0.63 | 80 | 9.46 | 19.4 |
| Silk | 3.2 | 7.38 | AN | 0.57 | 70 | 7.84 | 6.2 |
| Gelatin | 8.3 | 10.38 | AN | 0.56 | 70 | 10.90 | 5.0 |
| Wool | 5.4 | 2.91 | S | 0.60 | 80 | 3.11 | 6.9 |
| Nylon 6 | 3.7 | 13.79 | MMA | 0.60 | 80 | 16.09 | 16.1 |
| Nylon 66 | 5.9 | 9.37 | MMA | 0.78 | 80 | 9.83 | 4.9 |
| Nylon 6.10 | 9.0 | 13.54 | VA | 0.66 | 70 | 15.11 | 11.6 |

EXAMPLE 14

The procedure of Example 7 was repeated using 0.55 part of a compound having the formula $$Ni_2(CO)_6P_2(C_6H_5)_4$$

and the probable structure $$(CO)_3Ni \leftarrow P(C_6H_5)_2 \cdot P(C_6H_5)_2 \rightarrow Ni(CO)_3$$

50.37 parts of N-bromosuccinimide and 936 parts of methyl methacrylate. The yield of polymer was 60.76 parts.

EXAMPLE 15

The procedure of Example 7 was repeated using 0.55 part of a compound having the formula $$Ni_2(CO)_6P_2(C_6H_5)_4$$

and structure $$(CO)_3Ni \leftarrow P(C_6H_5)_2 \cdot P(C_6H_5)_2 \rightarrow Ni(CO)_3$$

19.8 parts of the sodium salt of N-chloro-p-toluene sulphonamide and 936 parts of methyl methacrylate. The yield of polymer was 128 parts.

EXAMPLE 16

The procedure of Example 7 was repeated using 0.55 part of a compound having the formula $$Ni_2(CO)_6P_2(C_6H_5)_4$$

and the probable structure $$(CO)_3Ni \leftarrow P(C_6H_5)_2 \cdot P(C_6H_5)_2 \rightarrow Ni(CO)_3$$

19.83 parts of N-chlorobenzamide and 936 parts of methyl methacrylate. The yield of polymer was 77.49 parts.

EXAMPLE 17

The procedure of Example 7 was repeated using 0.67 part of $Mo(CO)_6$, 35.5 parts of the sodium salt of N-chloro-p-toluene sulphonamide and 936 parts of methyl methacrylate. The yield of polymer was 113 parts.

EXAMPLE 18

0.51 part of $Mn_2(CO)_{10}$ and 50.87 parts of N-bromo succinimide were placed in a glass tube and degassed thoroughly under high vacuum, the tube being cooled by liquid nitrogen. 936 parts of methyl methacrylate were degassed under vacuum and distilled (also under vacuum) into the tube which was then sealed, warmed to melt the monomer, agitated in the dark to mix the contents and placed in a thermostat tank at 25° C. The mixture was then irradiated for 2 hours at this temperature by light of 4,300–4,500 A. wavelength obtained from a medium pressure mercury arc lamp shining through two Kodak "Wratten" gelatin filters (Numbers 98 and 2E).

The tube was then opened and the contents precipitated and purified as in Example 1 to yield 99 parts of polymer.

EXAMPLE 19

The procedure of Example 10 was repeated using 0.53 part of a compound having the formula $$Ni_2(CO)_6P_2(C_6H_5)_4$$

and the probable structure $$(CO)_3Ni \leftarrow P(C_6H_5)_2 \cdot P(C_6H_5)_2 \rightarrow Ni(CO)_3$$

29.75 parts of N-chlorinated wool (containing 0.89% chlorine) and 936 parts of methyl methacrylate. The reaction was carried out for 2 hours at 80° C. and the weight of the recovered wool was 31.9 parts, an increase of 7.2%.

EXAMPLE 20

0.56 part of the carbonyl nickel phosphine of Example 1 and 22.32 parts of the sodium salt of N-chloro-p-toluene sulphonamide were degassed in a glass reaction vessel under high vacuum. 1218 parts of vinylidene chloride (previously degassed) were distilled in and the vessel was then sealed and shaken. The vessel was kept at 25° C. for 65 hours and, on opening, 92 parts of polymer were obtained.

EXAMPLE 21

The procedure of Example 7 was repeated using 0.55 part of $Mo(CO)_6$, 43.63 parts of N,N-dichloro-p-toluene amide and 936 parts of methyl methacrylate. The yield of polymer was 247 parts.

EXAMPLE 22

The procedure of Example 7 was repeated using 0.63 part of $Mo(CO)_6$, 43.63 parts of N,N-dichloro-p-toluene sulphonamide and 936 parts of methyl methacrylate. The yield of polymer was 408 parts.

EXAMPLE 23

The process of Example 10 was repeated using 0.5 part of $Mo(CO)_6$, 45.84 parts of dry N-chlorinated wool (containing 0.18% by weight of chlorine) and 936 parts of methyl methacrylate. The mixture was maintained at 80° C. for 2 hours after which the vessel was opened and the contents were extracted and suspended in boiling chloroform for several hours. The treated wool was then filtered off, washed several times with chloroform and dried. It showed a weight increase of 6.4%. The ratio of methyl methacrylate polymer extracted by, and recovered from, the chloroform solution to that combined with the wool was found to be 23.3/1.

In a second experiment, 0.55 part of $Mo(CO)_6$ and 47.56 parts of the dry N-chlorinated wool were reacted with 18.72 parts of methyl methacrylate and 6.94 parts of toluene. That is, four-fifths of the volume of methyl methacrylate used in the initial experiment were replaced by an equal volume of toluene. In all other respects the reaction conditions were identical to those used in the first experiment.

The wool treated by this process was found to have had its weight increased by 4.1% and the ratio of methyl methacrylate polymer extracted by, and recovered from, the chloroform solution to that combined with the wool was found to be only 4.8/1.

We claim:
1. A process for modifying a polymer containing a plurality of >N—H groups, in fibrous form, comprises treating the polymer with a halogenating agent to halogenate at least one of the nitrogen atoms and thereafter contacting the halogenated product with ethylenically unsaturated monomeric material, which is normally polymerisable by free radicals, and a transition metal carbonyl.

2. A process according to claim 1 in which the polymer contains —CONH— groups.

3. A process according to claim 1 in which the polymer is halogenated to yield a product containing from 0.1 to 6% by weight of halogen.

4. Polymeric materials prepared by the process of claim 1.

References Cited

FOREIGN PATENTS 963,771    7/1964    Great Britain.
750,923    6/1956    Great Britain.

GEORGE F. LESMES, Primary Examiner

B. BETTIS, Assistant Examiner

U.S. Cl. X.R.

8—127.5, 128